United States Patent
Holdampf et al.

(10) Patent No.: US 7,264,310 B2
(45) Date of Patent: Sep. 4, 2007

(54) ADJUSTABLE SIDE BOLSTERS

(75) Inventors: Carl J. Holdampf, Farmington Hills, MI (US); Arnold James Wickham, Brighton, MI (US); Christopher Scott Welch, Pontiac, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 10/564,450

(22) PCT Filed: Jul. 21, 2004

(86) PCT No.: PCT/US2004/023374

§ 371 (c)(1),
(2), (4) Date: Jan. 12, 2006

(87) PCT Pub. No.: WO2005/110803

PCT Pub. Date: Nov. 24, 2005

(65) Prior Publication Data

US 2006/0214487 A1    Sep. 28, 2006

Related U.S. Application Data

(60) Provisional application No. 60/488,899, filed on Jul. 21, 2003.

(51) Int. Cl.
*B60N 2/64* (2006.01)
(52) U.S. Cl. .................................................. 297/284.9
(58) Field of Classification Search ............ 297/284.1, 297/284.9, 284.4, 284.11
See application file for complete search history.

(56) References Cited

U.S. PATENT DOCUMENTS

| | | | | |
|---|---|---|---|---|
| 3,550,953 A | * | 12/1970 | Neale | 297/312 |
| 4,353,595 A | * | 10/1982 | Kaneko et al. | 297/408 |
| 4,354,709 A | * | 10/1982 | Schuster | 297/284.4 |
| 4,370,000 A | | 1/1983 | Kazaoka et al. | |
| 4,500,136 A | | 2/1985 | Murphy et al. | |
| 4,536,030 A | | 8/1985 | Sakurada et al. | |
| 4,537,444 A | * | 8/1985 | Maruyama et al. | 297/284.9 |
| 4,636,000 A | * | 1/1987 | Nishino | 297/284.9 |
| 4,913,491 A | | 4/1990 | Mizuno et al. | |
| 4,924,162 A | | 5/1990 | Sakamoto et al. | |
| 4,938,529 A | | 7/1990 | Fourrey | |

(Continued)

FOREIGN PATENT DOCUMENTS

EP          1 078 810        2/2001

(Continued)

*Primary Examiner*—Peter R. Brown
(74) *Attorney, Agent, or Firm*—Clark Hill PLC (57) ABSTRACT

A seat frame assembly is provided for compactly folding a motor vehicle seat. The seat frame assembly includes a pair of spaced apart and parallel side frame members defining a vertical plane, and a lower cross member extending between the pair of side frame members. An actuator is pivotally secured to one of the pair of side frame members. A linkage assembly includes first and second link members, which are pivotally secured to one another. The first link member extends between the actuator and the second link member. A control arm is fixedly secured to the second link member and pivotally secured to the lower cross member. When the actuator is pivoted, the control arm moves between a support position extending away from the side frame members and a stowed position co-planar with the side frame members.

14 Claims, 6 Drawing Sheets

U.S. PATENT DOCUMENTS

| | | | |
|---|---|---|---|
| 5,087,098 A * | 2/1992 | Ishizuka | 297/284.4 |
| 5,286,087 A * | 2/1994 | Elton | 297/284.8 |
| 5,567,010 A * | 10/1996 | Sparks | 297/284.4 |
| 5,664,841 A * | 9/1997 | Dal Monte | 297/408 |
| 5,857,743 A | 1/1999 | Ligon, Sr. et al. | |
| 5,938,284 A | 8/1999 | Coffield | |
| 6,019,428 A | 2/2000 | Coffield | |
| 6,203,105 B1 | 3/2001 | Rhodes, Jr. | |
| 6,629,715 B2 | 10/2003 | Oh et al. | |
| 2003/0038517 A1 | 2/2003 | Moran et al. | |
| 2003/0107231 A1 | 6/2003 | Oh et al. | |

FOREIGN PATENT DOCUMENTS

| | | |
|---|---|---|
| FR | 2 816 555 | 5/2002 |
| WO | WO 2004/043730 | 5/2004 |

* cited by examiner

ADJUSTABLE SIDE BOLSTERS

This patent application is a §371 of PCT/US04/023374, filed on Jul. 21, 2004, which claims priority to and all the benefits of U.S. Provisional Patent Application No. 60/488,899 filed on Jul. 21, 2003.

BACKGROUND OF THE INVENTION

1. Field of the Invention

This invention relates to a seat frame assembly for a motor vehicle seat. More particularly, the invention relates to a seat frame assembly including adjustable side bolsters that allow for compact folding of a motor vehicle seat.

2. Description of Related Art

A motor vehicle includes one or more seat assemblies for supporting occupants within a passenger compartment. The seat assembly typically includes a seat cushion and a seat back pivotally secured to the seat cushion. The seat back is generally movable between an upright seating position and a stowed position, in which the seat back is folded against the seat cushion. When the seat back is in its stowed position, additional storage space is created within the passenger compartment above the folded seat back.

The seat cushion and the seat back each include side bolsters or side support structures for supporting a seat occupant. Such side bolsters are particularly useful in supporting the seat occupant during lateral accelerations of the motor vehicle. The side bolsters present, however, a problem during folding of the seat back into its stowed position. Specifically, the side bolsters along the seat cushion and/or seat back prevent the seat back and the seat cushion from folding completely flat against one another. As a result, an amount of space within the passenger compartment that would ideally be used for storage is instead occupied by the seat assembly.

Thus, it would be desirable to provide an adjustable side bolster that allows a seat back and a seat cushion to fold completely flat against one another in order to maximize storage space within a motor vehicle passenger compartment.

SUMMARY OF THE INVENTION

A seat frame assembly is provided for compactly folding a motor vehicle seat. The seat frame assembly includes a pair of spaced apart and parallel side frame members defining a vertical plane, and a lower cross member extending between the pair of side frame members. An actuator is pivotally secured to one of the pair of side frame members. A link assembly includes first and second link members, which are pivotally secured to one another. The first link member extends between the actuator and the second link member. A control arm is fixedly secured to the second link member and pivotally secured to the lower cross member. When the actuator is pivoted, the control arm moves between a support position extending away from the side frame members and a stowage position co-planar with the side frame members.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
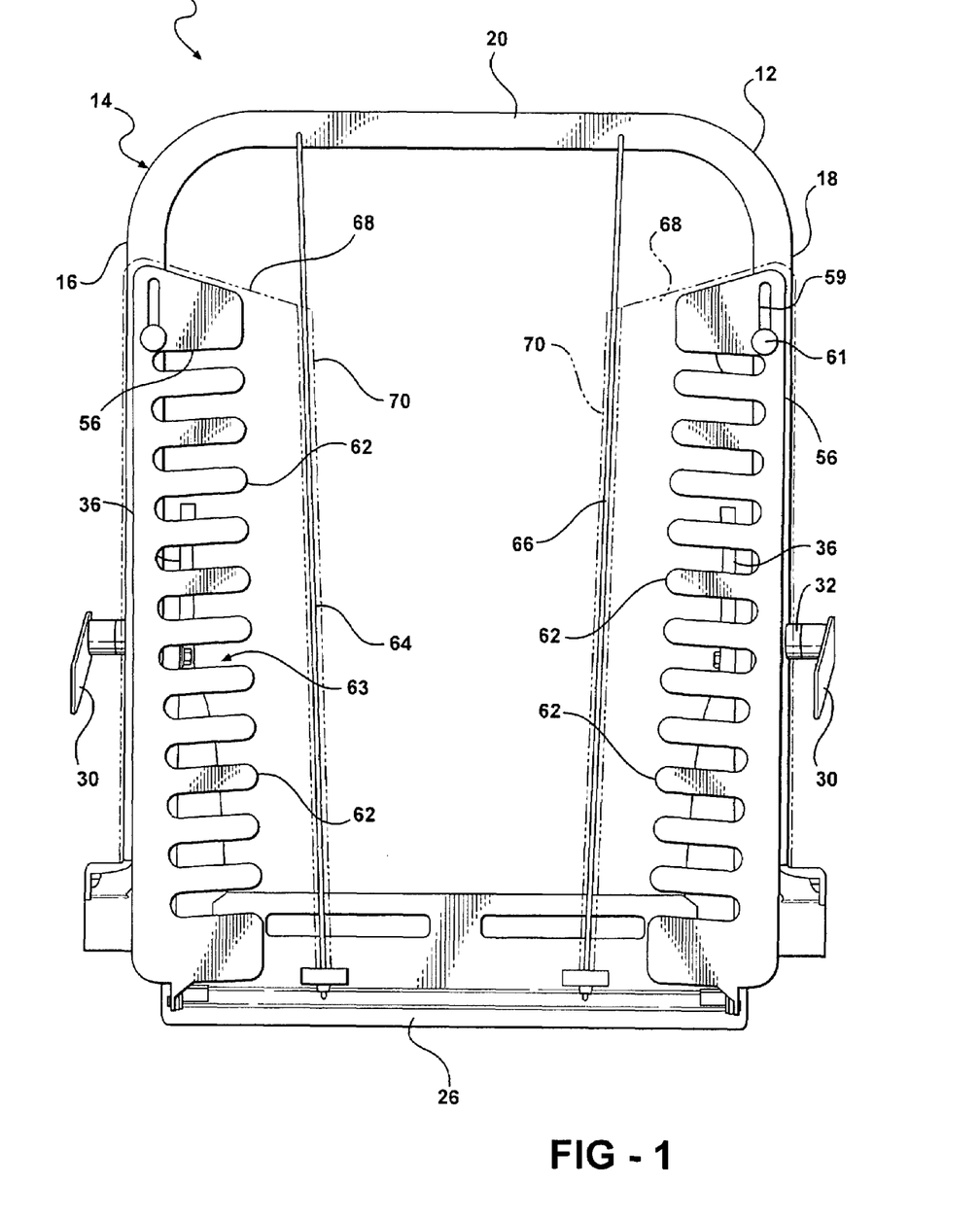
FIG. 1 is a front view of a seat frame assembly according to the invention.

Referring to FIG. 1, a seat, generally shown at 10, includes a seat back 12 for providing support to a seat occupant. The seat back 12 includes a seat frame assembly, generally indicated at 14, for supporting a foam pad (not shown) encased in a trim cover (not shown). It will be appreciated that although the seat frame assembly 14 for the seat back 12 is shown, the same general construction of the seat frame assembly 14 may be utilized for a seat cushion (not shown).

The seat frame assembly 14 includes side frame members 16, 18 and an upper cross member 20 extending between the side frame members 16, 18. The side frame members 16, 18 are generally parallel and define a vertical plane therebetween. The seat frame assembly 14 also includes a lower cross member 26 extending between the side frame members 16, 18. The lower cross member 26 is spaced apart from and parallel to the upper cross member 20.

Referring to FIGS. 1 through 4, an actuator 30 is pivotally secured to each of the side frame members 16, 18. In the embodiment shown, the actuator is an armrest 30. The armrest 30 pivots about a pivot pin 32 between a use position, shown in FIGS. 1 and 2, for supporting an arm of the seat occupant, and a retracted position, shown in FIG. 9, generally co-planar with the side frame members 16, 18. The pivot pin 32 interconnects the armrest 30 with one of the side frame members 16, 18. When the armrest 30 is in the retracted position, it is disposed along an outboard surface 24 of one of the side frame members 16, 18.

Figure 2:
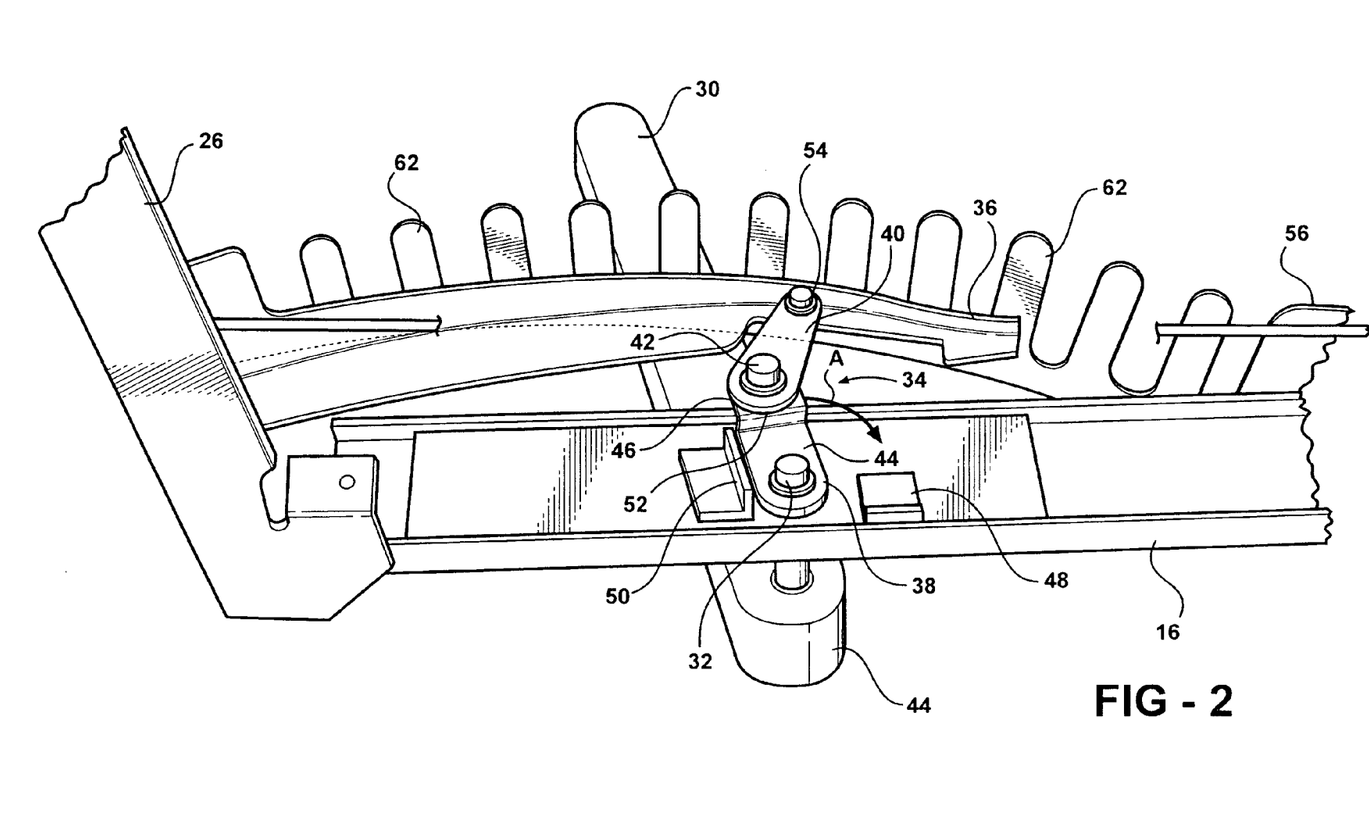
FIG. 2 is a fragmentary, perspective view of the seat frame assembly including an armrest in a use position.
Figure 3:
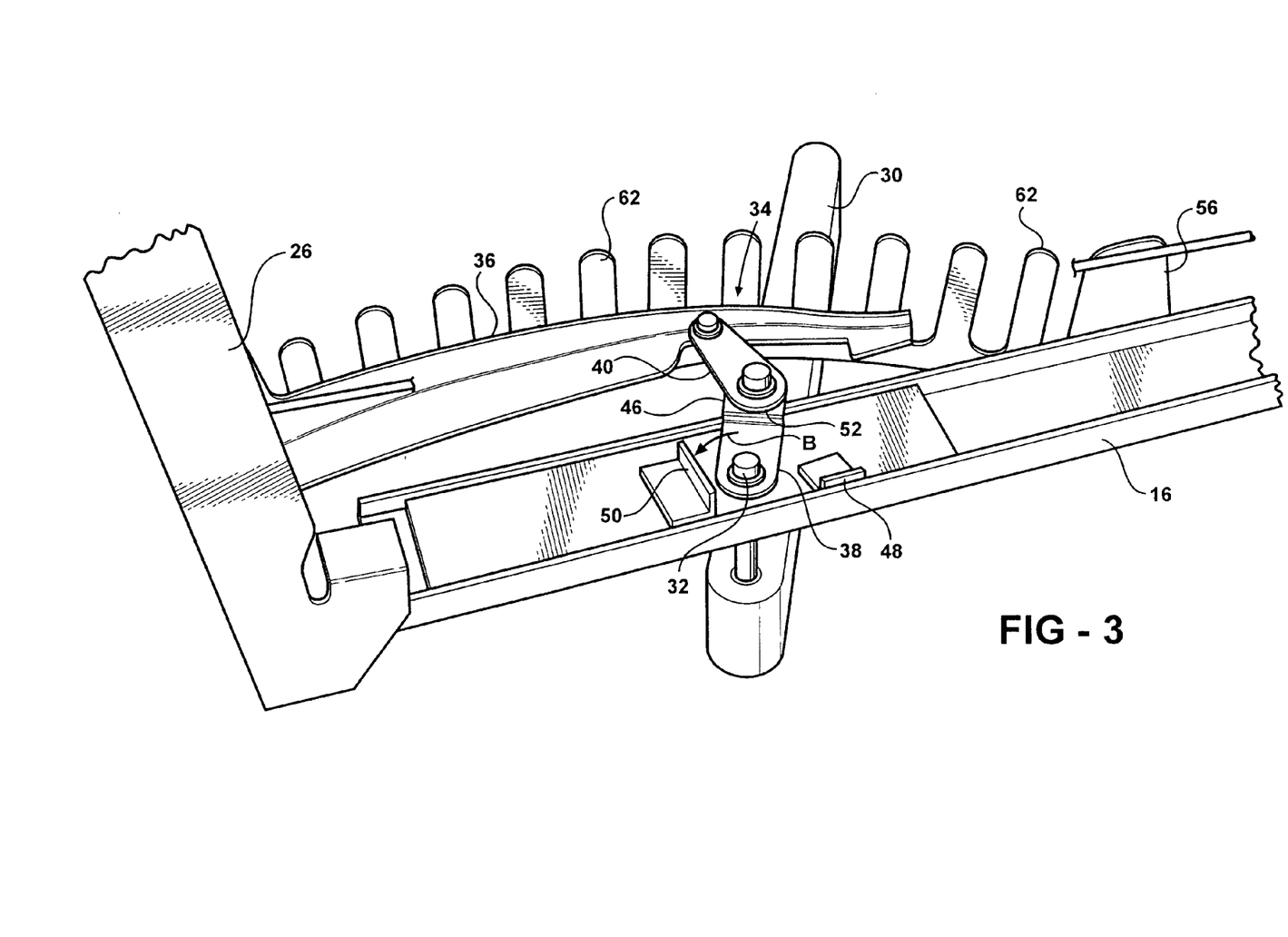
FIG. 3 is a fragmentary, perspective view of the seat frame assembly depicting the armrest moved out of the use position.
Figure 4:
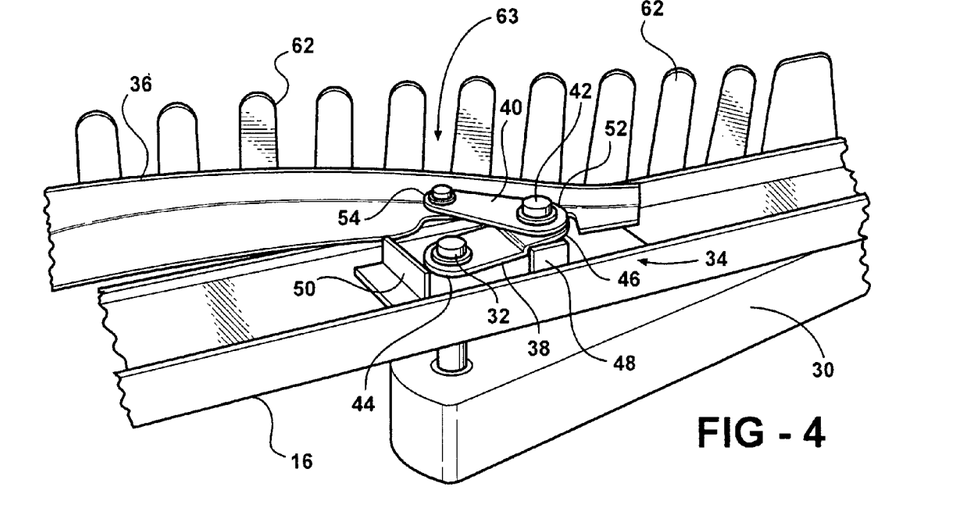
FIG. 4 is a fragmentary, perspective view of the seat frame assembly including the armrest in the retracted position.

Referring now to FIGS. 2 through 4, a linkage assembly, generally indicated at 34, extends between the pivot pin 32 along one of the side frame members 16, 18 and an adjustable control arm 36. The attachment of the linkage assembly 34 to the pivot pin 32 results in the linkage assembly 34 being operably connected to the armrest 30. While in a preferred aspect, the actuator 30 has been described above as being an armrest, it is contemplated that the actuator 30 may be any device or mechanism that could be utilized to effect movement of the control arm 36.

The linkage assembly 34 includes a first link member 38 and a second link member 40, which are pivotally secured to one another by a link pin 42. A distal end 44 of the first link member 38 is fixedly secured to the pivot pin 32 such that movement of the armrest 30 pivots the first link member 38 relative to one of the side frame members 16, 18. A proximal end 46 of the first link member 38 is pivotally secured to a proximal end 52 of the second link member 40.

Each of the side frame members 16, 18 includes an upper 48 and a lower 50 stop located therealong for limiting pivotal movement of the first link member 38. More specifically, the upper stop 48 limits pivotal movement of the first link member 38 towards the upper cross member 20 (as is caused by movement of the armrest 30 into its retracted position). The lower stop 50 limits movement of the first link member 38 towards the lower cross member 26 (as is caused by movement of the armrest 30 into its use position). The upper 48 and lower 50 stops are fixedly secured to the side frame members 16, 18 by welding or like methods.

The second link member 40 includes a distal end 54 pivotally and fixedly secured to the control arm 36. Movement of the armrest 30 between the use and retracted positions, as is shown in FIGS. 2 through 4, causes the second link member 40 of the linkage assembly 34 to pivot in an opposite direction relative to the first link member 38. Because the control arm 36 is fixedly secured to the second link member 40, pivotal movement of the second link member 40 urges movement of the control arm 36 relative to one of the side frame members 16, 18.

Figure 5:
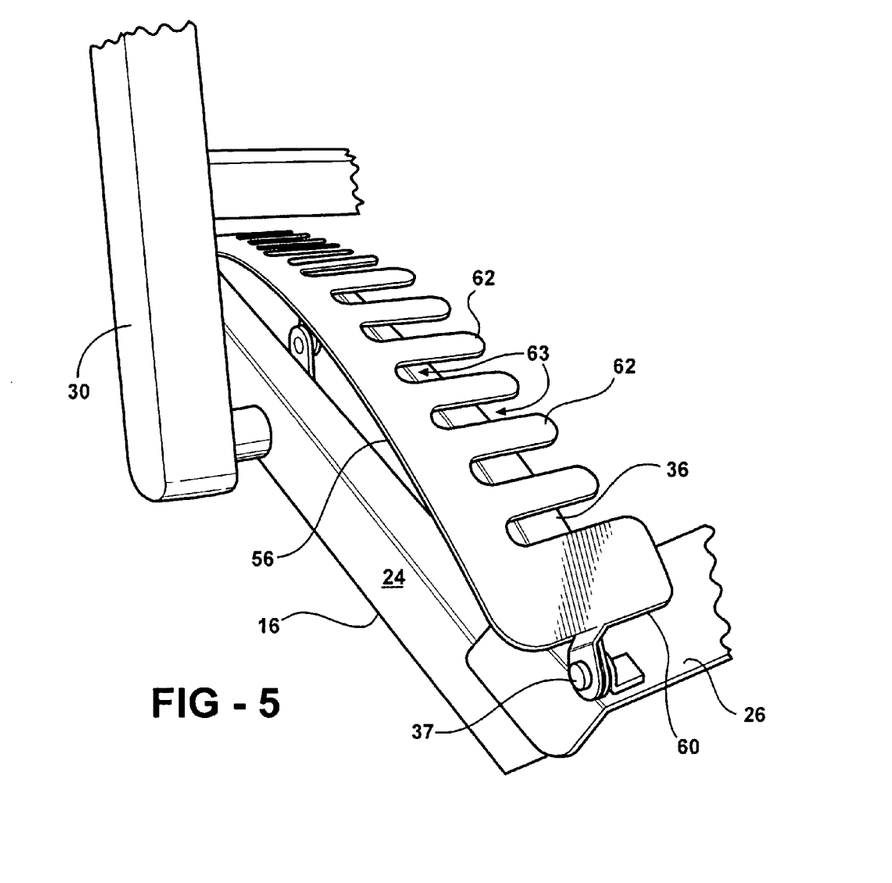
FIG. 5 fragmentary, perspective view of the pivotal attachment of a control arm and a plate to a lower cross member.

Referring to FIG. 5, the control arm 36 is also pivotally secured to the lower cross member 26 about a pivot pin 37 for movement towards and away from the vertical plane of the side frame members 16, 18. Specifically, the control arm 36 is movable between a support position, shown in FIGS. 5 and 8, and a stowage position, shown in FIG. 9. In the support position, the control arm 36 extends away from the side frame members 16, 18. In the stowage position, the control arm 36 is generally co-planar with the side frame members 16, 18, and is disposed along an inboard surface 22 of one of the side frame members 16, 18.

The control arm 36 provides lateral support for the seat occupant. Although the control arm 36 is shown as having a slight curvature, it is appreciated that the particular shape of the control arm 36 may vary depending on design preferences.

Figure 6:
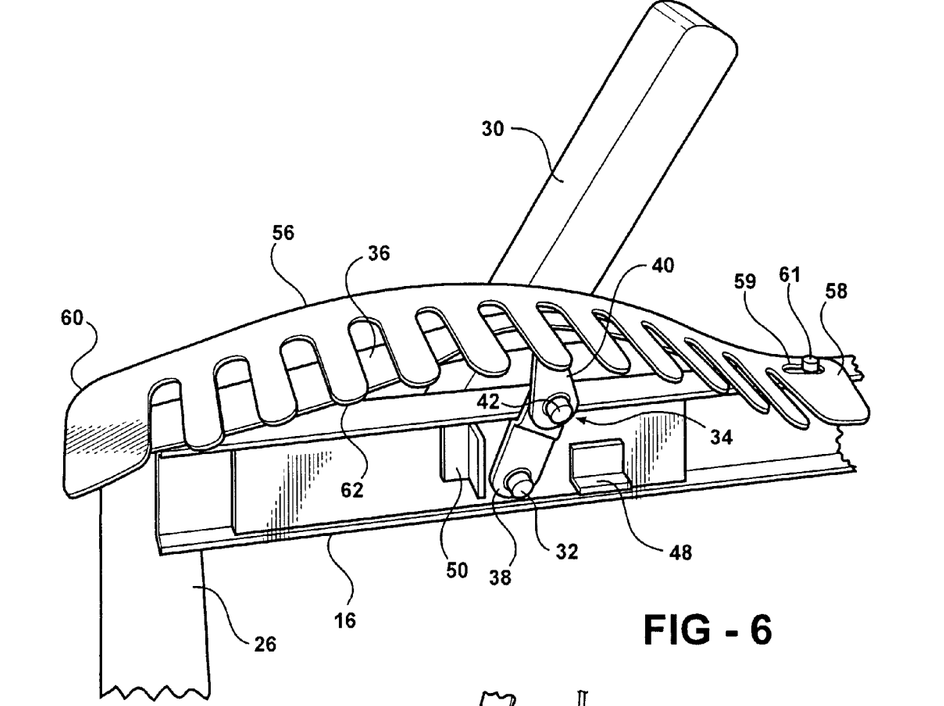
FIG. 6 is a fragmentary, side perspective view of the seat frame assembly including the control arm in a support position.

Referring now to FIGS. 5 and 6, a plate 56 overlies the control arm 36 and extends between an upper end 58 and a lower end 60. The upper end 58 of the plate 56 includes a slot 59 slidably receiving a connection pin 61 therein to fixedly secure the upper end 58 of the plate 56 to one of the side frame members 16, 18. The lower end 60 is pivotally secured to the lower cross member 26 about the pivot pin 37. Thus, the plate 56 and the control arm 36 both pivot about the pivot pin 37.

The plate 56 is flexible, and may be formed from a lightweight metal, a molded plastic material, or any other suitable material. The plate 56 defines a plurality of lateral fingers 62 extending between the upper 58 and lower 60 ends. An opening 63 is formed between each of the plurality of lateral fingers 62. The formation of the plurality of lateral fingers 62, along with the corresponding openings 63, provides the plate 56 with greater flexibility than a continuous plate without openings.

Figure 8:
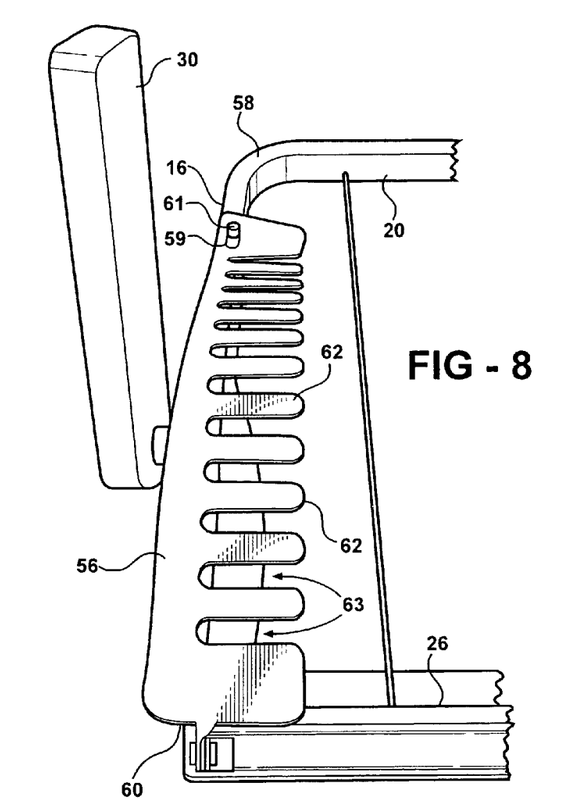
FIG. 8 is a fragmentary, perspective view of the seat frame assembly including the armrest in the use position and the control arm in the support position.
Figure 9:
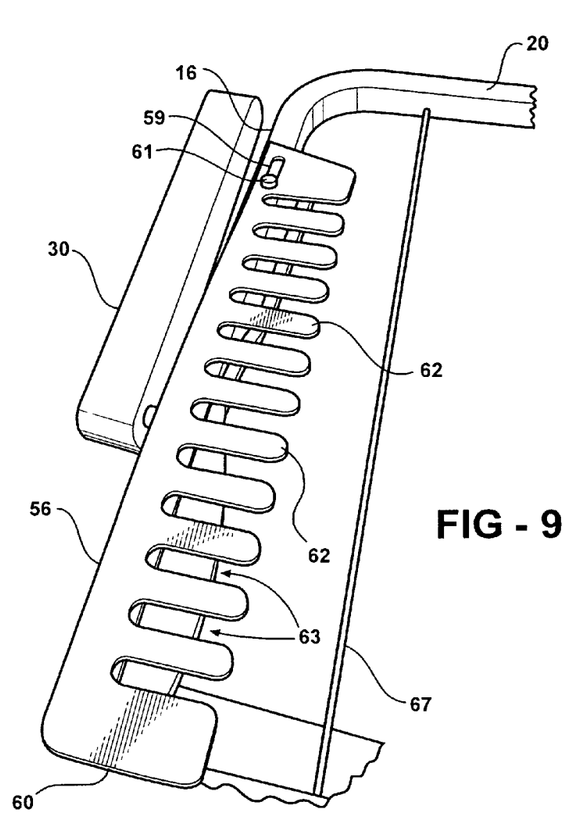
FIG. 9 is a fragmentary, perspective view of the seat frame assembly including the armrest in the retracted position and the control arm in a stowed position.

When the control arm 36 is in the support position, as shown in FIGS. 5 and 8, the control arm 36 presses the plate 56 away from the side frame members 16, 18; thereby giving the plate 56 a curved shape. The plurality of lateral fingers 62 allows the plate 56 to bend, but not break, in response to such pressing by the control arm 36. When the control arm 36 is in the stowage position, as shown in FIG. 9, the control arm 36 does not exert a force on the plate 56 so that the plate 56 is generally planar.

Figure 7:
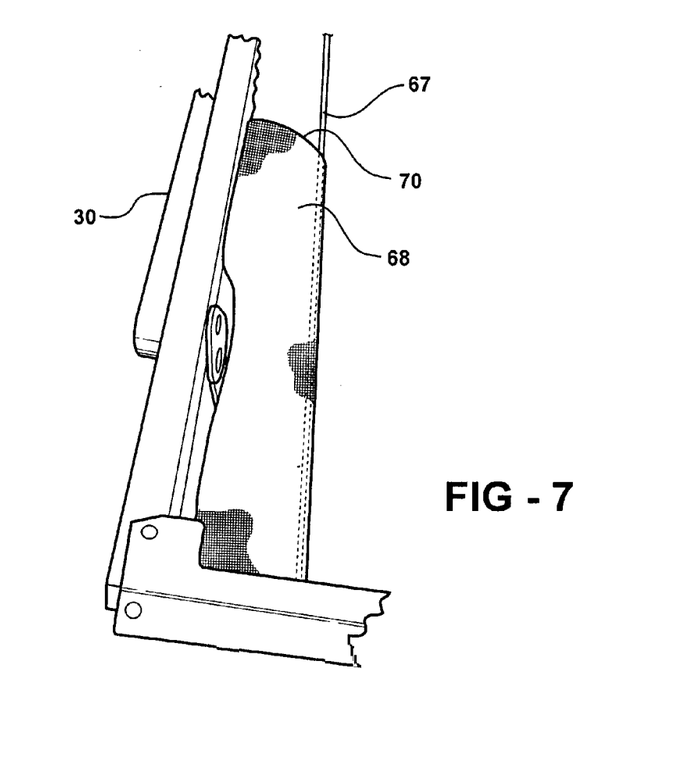
FIG. 7 is a fragmentary, perspective view of a bag encasing the plate.

Referring to FIGS. 1 and 7, a pair of support rods 64, 66 extends between the upper cross member 20 and the lower cross member 26. A mesh bag or wrap 68 encases the plate 56, and extends between the plate 56 and one of the support rods 64, 66 to provide cushioning for the seat occupant and shape the plate 56 and bolster area of the seat assembly 10. The bag 68 includes a sleeve 70 formed at one end for receiving one of the support rods 64, 66 therethrough.

Alternatively, the plate 56 may be formed from a molded plastic material wherein the plurality of lateral fingers 62 extends out to one of the pair of support rods 64, 66 for direct attachment thereto. As a result, the need for the bag or wrap 68 is eliminated.

In operation, starting with the armrest 30 in the use position, as shown in FIG. 8, and the control arm 36 in the support position, the armrest 30 is pivoted relative to the side frame members 16, 18 towards the upper cross member 20. The movement of the armrest 30 pivots the first link member 38 relative to the side frame members 16, 18, as shown in FIGS. 2 through 4. In response, the second link member 40 pivots about the link pin 42 in a direction opposite to that of the first link member 38. The pivoting of the second link member 40 urges the control arm 36 out of its support position. The control arm 36 also pivots about pivot pin 37 towards the side frame members 16, 18. The plate 56 pivots about the pivot pin 37 to allow the plate 56 to have a planar shape for folding of the seat assembly 14. When the first link member 38 abuts the upper stop 48, the armrest 30 has reached its retracted position and is disposed along the outboard surface 24 of one of the side frame members 16, 18. The abutment of the first link member 38 against the upper stop 48 also stops the pivoting of the second link member 40 about the link pin 42. At this time, the control arm 36 has reached its stowed position.

When the control arm 36 is in the stowed position, the side frame members 16, 18, the armrest 30, the control arm 36, and the plate 56 are generally co-planar with one another. As a result, the seat back 12 can be folded flat against the seat cushion for stowage of the seat 10. Ideally, the seat cushion incorporates the seat frame assembly 14 according to the invention to provide a seat that can be compactly folded. Such a folding arrangement maximizes storage space within a motor vehicle passenger compartment.

To move the armrest 30 from the retracted position back to the use position, the armrest 30 is pivoted downwards towards the lower cross member 26. The movement of the armrest 30 urges the first link member 38 to pivot relative to the side frame members 16, 18 towards the lower stop 50 mounted therealong. At the same time, the second link member 40 pivots about the link pin 42 in a direction opposite to that of the first link member 38. The second link member 40 pivots out away from the side frame members 16, 18. At the same time, the control arm 36 pivots about the pivot pin 37 relative to the lower cross member 26 and away from the side frame members 16, 18. The control arm 36 presses the plate 56 to give a curved shape to the plate 56 for forming a side bolster to support an occupant of a vehicle. The first link member 38 continues to pivot until it abuts the lower stop 50, at which time the armrest 30 has reached its use position. The abutment of the first link member 38 against the lower stop 50 also stops the pivoting of the second link member 40 about the link pin 42. At this time, the control arm 36 has reached its support position.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A seat frame assembly for compactly folding a motor vehicle seat, the seat frame assembly comprising:
   a frame;
   an actuator pivotally coupled to the frame;
   an elongated control arm having a first end pivotally coupled to the frame and an opposite second end for movement between a stowed position generally parallel and adjacent the frame and a support position spaced from the frame defining a contoured seat bolster section for supporting an occupant on the seat frame assembly;
   a linkage assembly coupled between the control arm and the actuator for moving the control arm between the stowed position and support position in response to actuation of the actuator, said linkage assembly including a first link member extending between a distal end fixedly secured to the actuator for synchronous pivotal movement therewith and an opposite proximal end, a second link member having a distal end pivotally secured to the control arm and an opposite proximal end, and a link pin pivotally coupling the proximal ends of the first and second link members for operatively coupling the actuator and control arm; and
   a pivot pin pivotally connecting and supporting both the actuator and the first link member on the frame for providing synchronous pivotal movement and directly driving of the first link member relative to the frame in response to pivotal movement of the actuator.

2. The seat frame assembly of claim 1 wherein the frame includes an upper stop engaging with the first link member for limiting pivotal movement of the first link member about the frame and defining the stowed position.

3. The seat frame assembly of claim 2 wherein the frame includes a lower stop engaging with the first link member for limiting pivotal movement of the first link about the frame and defining the support position.

4. The seat frame assembly of claim 3 wherein the frame includes a pair of spaced apart and generally parallel side frame members and a lower cross member attached to and extending between the side frame members.

5. The seat frame assembly of claim 4 wherein the control arm pivotally attaches to the lower cross member, the control arm pivoting about the lower cross member during movement between the stowed and support positions.

6. The seat frame assembly of claim 5 including an upper cross member spaced from and generally parallel to the lower cross member and attached to and extending between the side frame members.

7. The seat frame assembly of claim 1 wherein the actuator comprises an armrest.

8. A seat frame assembly for compactly folding a motor vehicle seat, the seat frame assembly comprising:
   a frame;
   an actuator pivotally coupled to the side frame member;
   an elongated control arm operatively coupled to the frame for movement between a stowed position generally parallel and adjacent the frame and a support position spaced from the frame defining a contoured seat bolster section for supporting an occupant on the seat frame assembly;
   a linkage assembly coupled between the control arm and the actuator for moving the control arm between the stowed position and support position in response to actuation of the actuator; and
   a plate extending between a lower end pivotally secured to the frame and an upper end slidably coupled to the frame, the plate operatively contacting the control arm wherein movement of the control arm between the stowed and support positions causes concurrent movement of the plate.

9. The seat frame assembly of claim 8 wherein the frame includes a pair of spaced apart and generally parallel side frame members, a lower cross member attached to and extending between the side frame members and an upper cross member spaced from and generally parallel to the lower cross member and attached to and extending between the side frame members, the plate extending between the lower end pivotally secured to a lower cross member and the upper end slidably coupled to one of the side members.

10. The seat frame assembly according to claim 9 wherein the upper end of the plate includes a slot formed therein for receiving a connection pin to slidably couple the plate to the side frame member, the slot allowing the upper end to move along the pin as the lower end pivots about the lower cross member.

11. The seat frame assembly of claim 10 wherein the plate defines a plurality of lateral fingers, the plurality of lateral fingers separated from each other by openings and wherein the plurality of lateral fingers extends from the lower end of the plate to the upper end of the plate.

12. The seat frame assembly of claim 11 including a wrap encasing the plate defining the side bolster section of the seat frame assembly.

13. The seat frame assembly of claim 12 including a pair of support rods spaced from and generally parallel to the side frame members, the support rods extending between the lower cross member and the upper cross member.

14. The seat frame assembly of claim 13 wherein the wrap includes a sleeve adapted to receive one of the support rods therethrough.

* * * * *